United States Patent [19]

Hood, Jr. et al.

[11] Patent Number: 4,870,988

[45] Date of Patent: Oct. 3, 1989

[54] ONE-PIECE DRAIN HOSE FOR AN AUTOMATIC WASHER

[75] Inventors: Richard D. Hood, Jr., Benton Township, Berrien County; John D. Cleminshaw, St. Joseph; Jack E. Blakeman, Oronoko Township, Berrien County, all of Mich.

[73] Assignee: Whirlpool Corporation, Benton Harbor, Mich.

[21] Appl. No.: 267,682

[22] Filed: Nov. 2, 1988

Related U.S. Application Data

[63] Continuation of Ser. No. 105,347, Oct. 7, 1987, abandoned.

[51] Int. Cl.[4] .......................... F16L 3/00; F16M 13/00
[52] U.S. Cl. ............................... 137/343; 137/355.17; 248/79; 248/544
[58] Field of Search .............. 137/343, 355.16, 355.17, 137/565, 577; 285/192; 248/75, 79, 544, 56

[56] References Cited

U.S. PATENT DOCUMENTS

| | | | |
|---|---|---|---|
| 357,900 | 3/1887 | Boyle | 137/355.28 |
| 1,604,465 | 10/1926 | Merker | 137/149 |
| 2,671,626 | 3/1954 | Schmadeke | 248/75 |
| 2,757,962 | 8/1956 | MacLeod | 248/56 |
| 3,204,902 | 7/1964 | David | 137/152 |
| 3,381,700 | 5/1968 | Frymark | 68/208 |
| 3,388,716 | 6/1968 | Wilson | 137/355.22 |
| 3,456,680 | 7/1969 | Martiniak | 137/355.17 |
| 3,459,202 | 8/1969 | Roberson | 137/355.17 |
| 3,461,906 | 8/1969 | Eckerle | 137/355.17 |
| 3,520,725 | 7/1970 | Hamrick | 137/355.16 |
| 3,675,448 | 7/1972 | Smith | 68/208 |
| 3,710,819 | 1/1973 | Williamson | 137/355.17 |
| 3,760,838 | 9/1973 | Hall, Jr. | 134/186 |
| 3,860,978 | 1/1975 | Wirth | 4/207 |
| 3,880,188 | 4/1975 | Oakley, Jr. et al. | 137/355.17 |
| 3,911,944 | 10/1975 | Hukuba et al. | 137/355.2 |
| 4,133,347 | 1/1979 | Mercer | 137/355.16 |
| 4,223,702 | 9/1980 | Cook | 138/106 |
| 4,231,595 | 11/1980 | Knutsen | 137/899.3 |
| 4,237,919 | 12/1980 | Crawford et al. | 134/186 |
| 4,318,519 | 3/1982 | Blevins | 248/79 |
| 4,377,301 | 3/1983 | Craig et al. | 248/544 |
| 4,380,243 | 4/1983 | Braley | 137/312 |
| 4,418,712 | 12/1983 | Braley | 137/312 |

*Primary Examiner*—A. Michael Chambers
*Attorney, Agent, or Firm*—Hill, Van Santen, Steadman & Simpson

[57] ABSTRACT

A one-piece drain hose for an automatic washer is provided wherein the hose is attached to a discharge outlet of a pump by an adapter integrally molded onto the hose at a first end. The hose, which is formed of a corrugated plastic material, passes through an opening in the cabinet wall and is connected to a drain. A stop member is immovably carried on the hose to prevent it from being withdrawn from the washer cabinet by an excessive amount. A hose hanger is provided to hold a short portion of the hose in an exposed position while the remainder of the hose is positioned in the interior of the cabinet during shipping.

16 Claims, 3 Drawing Sheets

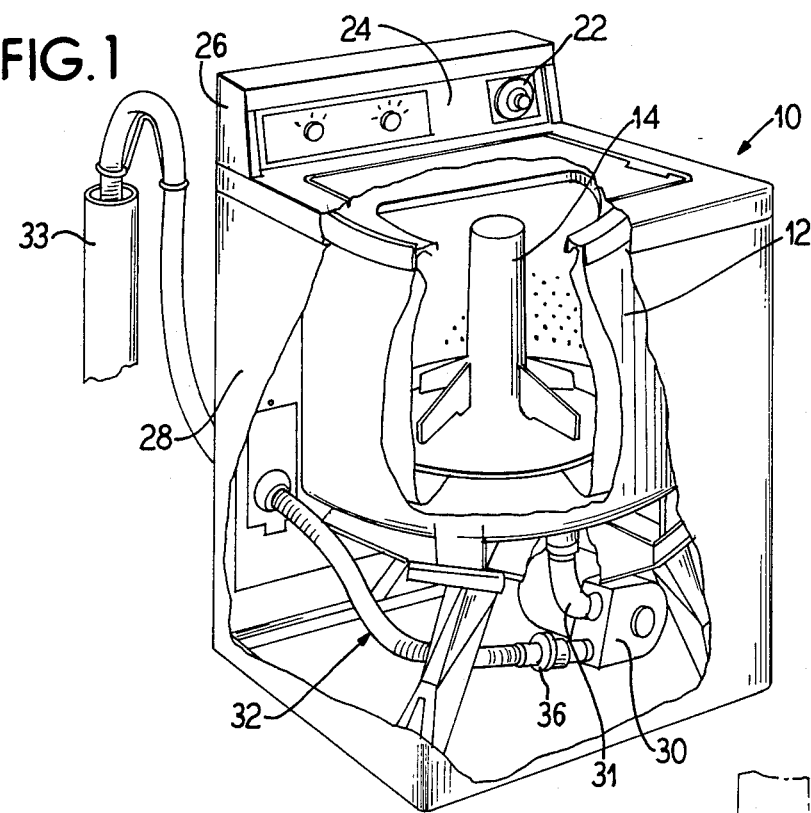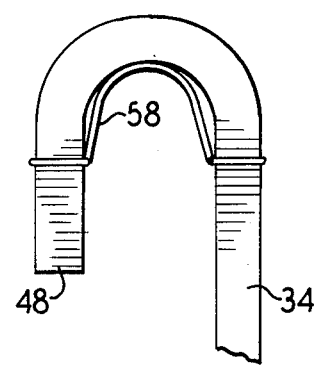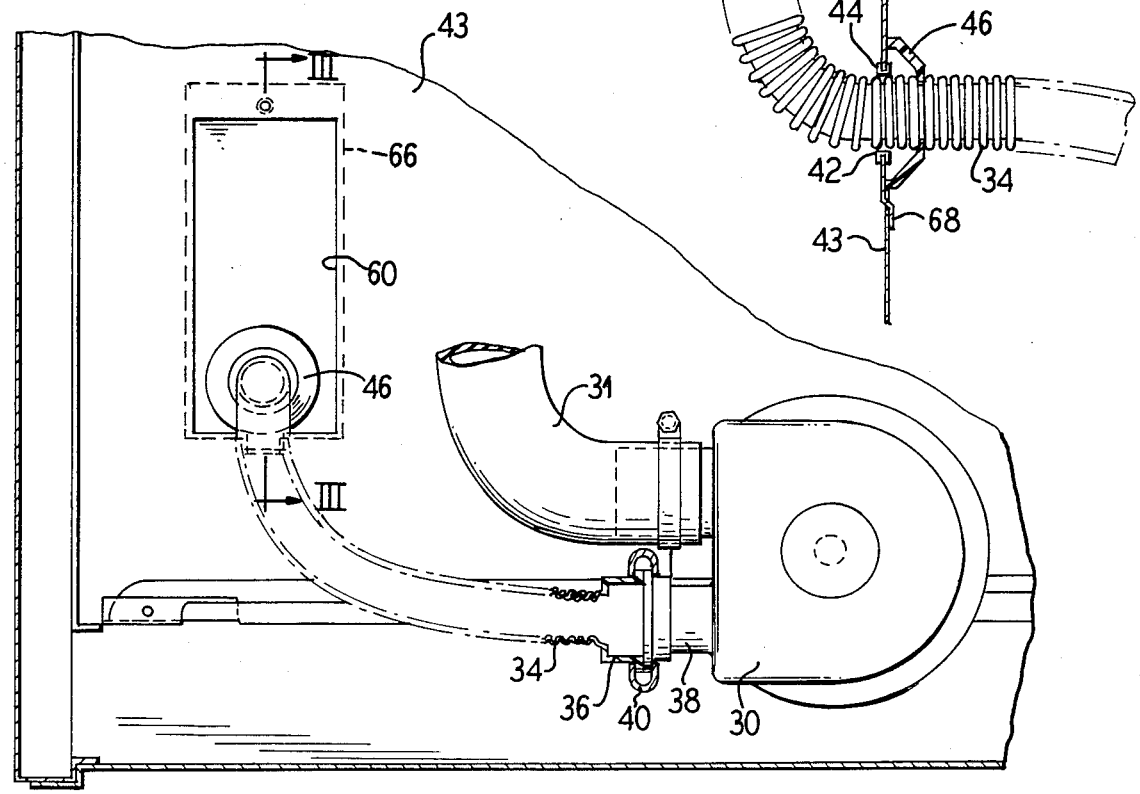

ONE-PIECE DRAIN HOSE FOR AN AUTOMATIC WASHER

This is a continuation, of application Ser. No. 105,347, filed 10/7/87.

BACKGROUND OF THE INVENTION

1. Field of the Invention

The present invention relates to automatic washers and more particularly to the drainage connection system between the washer pump and a drain.

2. Description of the Prior Art

Automatic washers generally have a water inlet supply which introduces water to the interior of a wash tub to be used during an agitation portion of a wash cycle. A pump is generally provided to remove extracted wash liquid from the tub and to direct it to a drain through a drainage system. In the past, the drainage system from the pump to the household drain has included a number of separate elements and connections which resulted in some problems due to potential leakage points at each connection location as well as involved or complicated installation procedures due to multiple connections.

In some instances the drain line is attached to an adapter connection at the rear wall of the washer, the drain lines being directed at their free ends to a drain. In other instances, particularly in portable units, the drain hose is sometimes stored within the cabinet and removed therefrom for each particular use. In those cases, generally the drain hose and the inlet hoses are attached at their free ends onto an adapter, such as that disclosed in U.S. Pat. No. 3,880,188, assigned to the assignee of the present application. This adapter is connected to a source of water, normally a sink faucet and the adapter directs the discharge water through a drain outlet into the sink drain.

SUMMARY OF THE INVENTION

The present invention provides an improvement in a drainage system for an automatic washer in which a one-piece drain hose system is provided which improves reliability of the drainage system by eliminating multiple connections present in previously available automatic washers. The drain hose consists of a single piece corrugated hose that has an injection molded coupling formed on one end of the hose which is connected directly to the discharge port of the washer pump and has a second end which is to be inserted into a drain or otherwise disposed so as to direct fluid from the hose to a drain, such as by being attached to a wash tub connected to a drain.

Carried on the hose is a stop member which has an external diameter greater than that of the hose. The hose, is connected at its first end to the pump in the interior of the washer cabinet, passing through an opening in the cabinet to be connected to the drain. A grommet is provided to line the hole in the cabinet to provide a smooth, snag-free surface for the drain hose to pass through.

The stop member has a diameter sufficiently large to prevent it from passing through the opening in the cabinet. The stop member is secured to the hose and its purpose is to engage against the washer cabinet to provide a strain relief on the hose between the pump and the washer cabinet. During shipping, the hose is carried within the cabinet such that only a short portion of the hose is exposed through the opening in the cabinet and this short exposed length is held in place by a hose hanger which engages around the exterior of the hose to provide an interference fit with the hose and is secured to the exterior of the cabinet by a mounting tab engagable into an opening in the cabinet.

To install a washing machine, the hose hanger is either removed from the hose, or the hose is pulled through an aperture in the hanger as the hose is pulled slowly through the hole in the cabinet until it can be pulled no further, the stop member engaging against the interior of the cabinet. A drain hose retainer is attached to the free end of the hose and the free end is inserted into the drain.

Therefore, since only a single connection is made, that between the integral hose coupling and the pump, the ease and efficiency of installation of the washer is greatly improved as well as is the reliability of the drainage system.

BRIEF DESCRIPTION OF THE DRAWINGS

FIG. 1 is a perspective view of an automatic washer incorporating the principles of the present invention.

FIG. 2 is a partial front view of the interior of the washer of FIG. 1 illustrating the inventive drain system of the present invention.

FIG. 3 is a sectional view of the cabinet panel through which the hose passes, shown in the installed condition.

FIG. 4 is a partial view of the free end of the hose and hose retainer in the installed condition.

DESCRIPTION OF THE PREFERRED EMBODIMENTS

Figure 5:
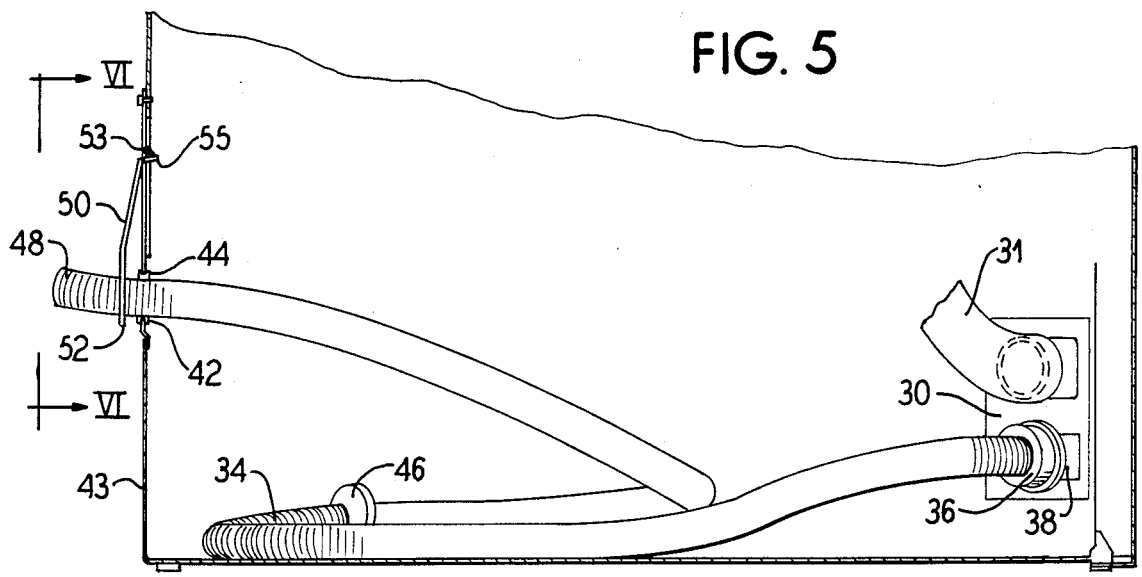
FIG. 5 is a side sectional view of the washer showing the hose in the shipping condition.

In FIG. 1 a washing machine is generally shown at 10 as having a tub 12 with a vertical agitator 14 therein, a water supply (not shown), a power supply (not shown), an electrically driven motor 16 operably connected via a transmission to the agitator 14, and controls including a pre-settable sequential control means 22 for use in selectively operating the washing machine 10 through a programmed sequence of washing, rinsing and extracting steps. The control means 22 is mounted to a panel 24 of a console 26 on the washing machine 10.

The washing machine 10 has an exterior cabinet 28 which encloses the mechanism of the washer. A pump 30 is operably connected to the motor 16 and is used to pump soiled wash liquid from the washing machine tub 12 and pump inlet conduit 31 through a drainage system 32 incorporating the principles of the present invention to an exterior drain 33.

The drainage system is shown in greater detail in FIGS. 2–9 wherein it is seen that the drainage system is comprised of a drain hose 34 which is a one-piece hose having a corrugated exterior surface formed by alternating grooves 34A and ridges 34B along virtually its entire length with a coupling 36 integrally formed with the hose at a first end, such as by injection molding. The coupling 36 on the drain hose 34 is sized to press fit onto a discharge outlet 38 of the pump 30, and is secured thereon by means of a hose clamp 40. The washer cabinet 28 has an opening 42 therethrough, preferably in a rear wall 43 of the cabinet, through which the hose 34 passes. The opening 42 is at least slightly larger in diameter than the hose 34 to permit the hose to pass relatively easily through the opening. A grommet 44 is provided to line the opening 42 to provide a smooth, snag-free surface for the drain hose 34 to pass through. Since the cabinet is generally formed from a metallic material and the drain hose 34 is preferably formed of a plastic material, without the grommet, which also is preferably formed of a plastic or rubber material, the hose would have an increased likelihood of being cut or damaged by the opening 42.

Figure 8:
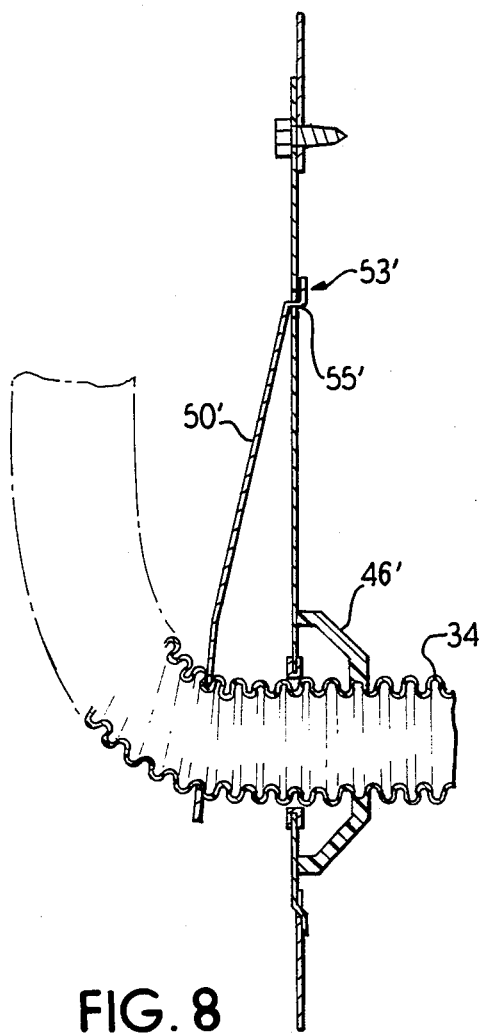
FIG. 8 is a sectional view of the panel through which the hose passes shown in the installed condition with an alternative embodiment of a hose hanger.
Figure 9:
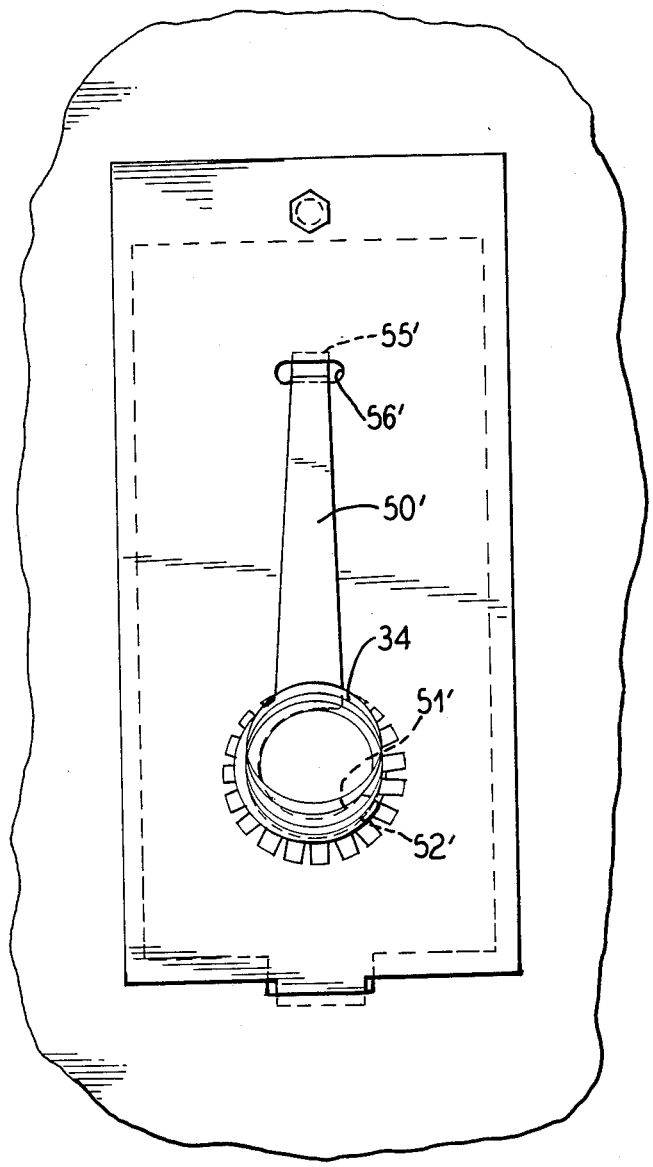
FIG. 9 is an elevational view of the panel through which the hose passes shown in the installed condition with the hose hanger of FIG. 8.

Secured on the hose is a stop member 46 which is an annular cup-shaped member with a central opening 46A sized to be captured in the grooves 34A of the hose so that the stop member can be retained on the hose at a position whereby the length of the hose from the coupling 36 to the stop member 46 is at least slightly greater than the actual distance from the pump discharge outlet 38 to the opening 42. The stop member 46 may also be formed integrally with the hose during the molding process as seen in FIG. 8 or may be permanently secured to the hose, such as by an adhesive. When the hose 34 is pulled from the interior of the cabinet 28, the stop member 46 which has a rim portion 46B at its periphery, will engage an interior surface 47 of the washer cabinet 28 prior to the portion of the hose between the stop member 46 and the coupling 36 becoming taut. Thus, the stop member 46 provides a strain relief on the hose 34 between the pump 30 and the washer cabinet 28.

Figure 7:
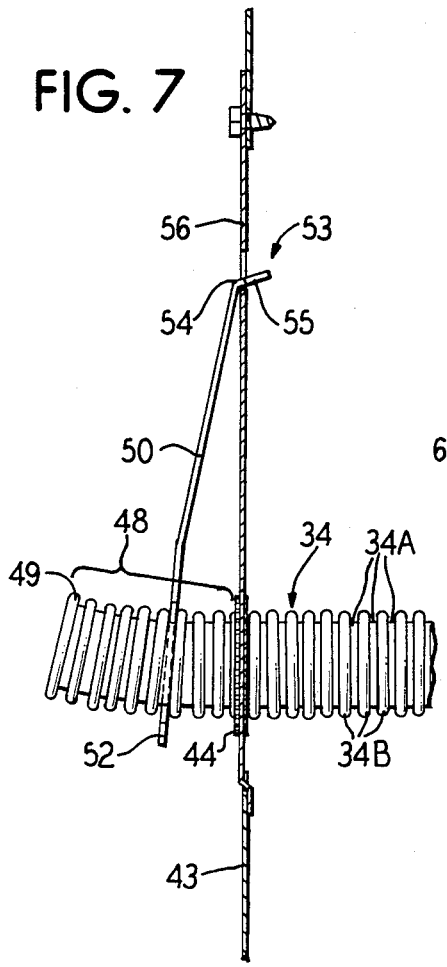
FIG. 7 is a sectional view of the panel through which the hose passes shown in the shipping condition.
Figure 6:
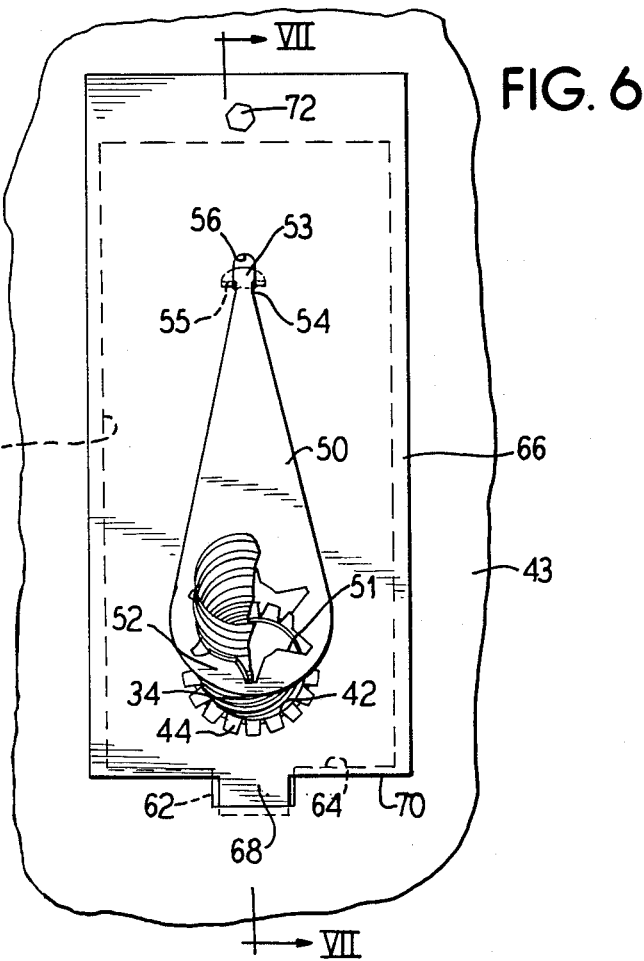
FIG. 6 is an elevational view of the panel through which the hose passes, shown in the shipping condition.

When the washer 10 is being shipped, the hose 34 is preferably stored in the interior of the cabinet 28 with a short portion 48 at a free second end 49 of the hose being exposed on the exterior of the cabinet 12 as is illustrated in FIGS. 5, 6 and 7. To assure that the free end 49 of the hose remains in the exposed position and does not fall entirely into the cabinet, an interference means which may be in the form of a hose hanger 50 (FIGS. 5-7) is provided which has means to provide a interference fit with the hose such as in the form of a star shaped opening 51 near a first end 52 removably engagable into the grooves 34A of the corrugated hose to securely retain the hanger on the hose. A second end 53 of the hanger has a narrow neck 54 which enlarges to a wider tab portion 55 and the cabinet panel has a small opening 56 therethrough for receiving the neck 54 of the hose hanger 50 which prevents the tab portion 55 from detaching. The hanger 50 is formed of a flexible plastic material so the tab can be inserted and removed upon application of sufficient force, but under normal circumstances the hanger will be securely held on the cabinet panel. By such an attachment, the free end of the hose is removably retained on the exterior of the cabinet. The interference means may also be in the form of an elongated hose hanger member 50' (FIGS. 8-9) with a C-shaped opening 51' at a first end 52' to partially encircle the hose 34 to thereby provide the desired interference fit. A second end 53' has a hook 55' that attaches through an aperture 56' in the cabinet to hold the interference means in place. Many other configurations of the interference means could also be utilized so long as they serve to hold the hose from moving relative to the washer cabinet in at least an inward direction.

For installation of the washer, the installer need only remove the hanger 50 or 50' from the hose 34 if desired, pull the hose slowly through the opening 42 in the cabinet (and through the star-shaped opening 51 or C-shaped opening 51' if the hanger 50, 50' has not been removed) until the hose can be pulled no further, due to the stop member 46 engaging the cabinet panel on the interior as seen in FIG. 3, attach a drain hose retainer 58 (FIG. 4) which merely holds the free end of the hose in a U-shape, and insert the free end of the hose into the drain 33. The drain can be either a standpipe type of drain or can be a wash tub connected to a drain. If the hose hanger 50, 50' is left on the hose, the interference fit will prevent the hose from moving back into the interior of the cabinet. If an interference means in the form of hose hanger member 50' is used, the C-shaped opening 51' can be disengaged and reengaged with the hose by a swinging or pivoting action of the hanger 50'. Thus, the hanger 50' can be swung back to reengage with the hose in the withdrawn position of the hose to lock it in place (see FIG. 8).

If the machine is to be moved to a different location, the hose can be easily returned to the interior of the cabinet by feeding the hose 34 through the opening 42 in the cabinet wall (and perhaps through the hose hanger opening if it is still attached) until only a couple of inches of hose remains exposed. The hose hanger 50, 50' can be reattached to the free end 49 of the hose, after the hose retainer 58 has been removed, and the machine can then be shipped to the new location. Reinstallation of the machine at the new location occurs in the same manner as described above.

To assist in the manufacturing process, the rear wall 43 of the cabinet 28 may have a large rectangular opening 60 formed therein with a notch 62 cut out in a bottom edge 64 thereof. A separate rectangular panel 66 slightly larger in height and width than the rectangular opening 60 may be provided which has a tongue 68 formed at a bottom end 70 of the panel, the tongue being slightly narrower, but slightly longer than the cut out 62 in the opening. The panel 66 would have the opening 42 for the hose formed therein and also the opening 56 for the neck of the hose hanger 50 and would be removably secured to the rear wall 43 by means of an interengagement of the tongue 68 into the cut out 62 and the use of a threaded fastener 72 near a top end of the panel 66 to engage into the rear wall 43. The use of such a removable panel 66 provides an enlarged opening into the interior of the cabinet 28 so that the hose 34 which is attached to the discharge outlet 38 of the pump at the first end, can be grasped and inserted through the opening 42 as described above. In normal operation, this panel would not be opened or removed.

Thus, it can be seen that the present invention provides a one-piece drain hose system which improves reliability in the drainage system by eliminating multiple connections. Further, the drain hose system of the present invention results in easy and efficient installation of the washer.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A drain system for an automatic washer having a cabinet surrounding a wash tube connected to an exterior drain by means of a conduit extending from said tube to a pump and from said pump to said drain comprising:
   a one-piece hose having a coupling integrally formed on a first end, said coupling being sized to attach to a discharge outlet of said pump,
   an opening formed in a wall of said washer cabinet sized at least slightly larger than a diameter of said hose,
   a stop means on said hose for engaging said cabinet wall upon sufficient withdrawal of said hose through said opening; and
   an interference means for removably engaging said hose with a first portion and for engaging said cabinet wall with a second portion;
such that said first end of said hose is secured to said pump discharge outlet and said second end of said hose is directed through said opening to be retained in a slightly exposed position by said interference means during a shipping period until grasped to withdraw additional portions of said hose from the interior of said cabinet until said stop means engages said cabinet wall as said second free end is directed toward a drain.

2. A drain system according to claim 1, wherein said hose has a corrugated exterior surface formed with alternating grooves and ridges.

3. A drain system according to claim 1, wherein said hose is fabricated of a plastic material and said coupling is molded integrally with said hose.

4. A drain system according to claim 1, wherein said stop means comprises a stop member immovably carried on said hose at a distance which is at least slightly greater than a distance from said pump discharge outlet to said cabinet opening, said stop member having a diameter greater than said opening.

5. A drain system according to claim 4, wherein said stop member is molded integrally with said hose.

6. A drain system according to claim 4, wherein said stop member is secured to said hose by an adhesive.

7. A drain system according to claim 1, wherein said interference means comprises a hose hanger formed of a resilient, flexible plastic sheet form material with a star-shaped opening formed at a first end, said opening sized to removably engage said hose, and a widened tab portion at a second end of said hanger with a narrow neck area therebetween, said cabinet wall having a narrow second opening above said hose opening for receiving said neck portion of said hanger while preventing passage of said tab portion without deformation of said tab.

8. A drain system according to claim 2, wherein said interference means engages into one of said grooves in said hose at said first portion and engages into an opening in said cabinet wall at said second portion.

9. A drain system according to claim 1, wherein said interference means comprises a member having a C-shape opening engagable with said hose at said first portion and a hook engagable with said cabinet at said second portion.

10. A drain system according to claim 1, including a hose retainer for selectively retaining a second free end of said hose in a U-shaped configuration for directing said second end of said hose toward said drain.

11. A one-piece drain hose system for an automatic washer having a cabinet surrounding a wash tub connected to an exterior drain by means of a conduit extending from said tub to a pump and from said pump to said drain comprising:
   a one-piece hose having a corrugated exterior surface formed with alternating grooves and ridges, said hose being fabricated of a plastic material and having a coupling integrally molded onto a first end, said coupling being sized to press fit onto a discharge outlet of said pump,
   an opening formed in a wall of said washer cabinet sized slightly larger than a diameter of said hose,
   a grommet lining said cabinet opening,
   a stop member immovably positioned on said hose at a distance from said first end which is at least slightly greater than a distance from said pump discharge outlet to said cabinet opening,
   said stop member having a diameter greater than said opening,
   an interference means for removably engaging said hose with a first portion and for engaging said washer cabinet wall with a second portion, and
   a hose retainer for retaining a second free end of said hose in a U-shaped configuration,
such that said first end of said hose is secured to said pump discharge outlet and said second end of said hose is directed through said first opening to be retained in a slightly exposed position by said interference means during a shipping period and, after removal of said interference means, can be grasped to withdraw additional portions of said hose from the interior of said cabinet until said stop member engages said wall whereupon said hose retainer can be attached to said second free end and said second free end directed toward a drain.

12. A drain system according to claim 11, wherein said stop member is molded integrally with said hose.

13. A drain system according to claim 11, wherein said stop member is secured to said hose by an adhesive.

14. A drain system according to claim 11, wherein said interference means engages into one of said grooves in said hose at said first portion and engages into an opening in said cabinet wall at said second portion.

15. A drain system according to claim 11, wherein said interference means comprises a member having a C-shape opening engagable with said hose at said first portion and a hook engagable with said cabinet at said second portion.

16. A drain system for an automatic washer having a cabinet surrounding a wash tube connected to an exterior drain by means of a conduit extending from said tub to a pump and from said pump to said drain comprising:
   a one-piece hose having a corrugated exterior surface formed with alternating grooves and ridges,
   said hose being fabricated of a plastic material and having a coupling integrally molded onto a first end, said coupling being sized to press fit onto a discharge outlet of said pump,
   an opening formed in a wall of said washer cabinet sized slightly larger than a diameter of said hose,
   a grommet lining said cabinet opening,
   a stop member immovably positioned on said hose at a distance from said first end which is at least slightly greater than a distance from said pump discharge outlet to said cabinet opening, said stop member having a diameter greater than said opening, an interference means for removably engaging said hose with a first portion and for engaging said washer cabinet wall with a second portion, and a hose retaining for retaining a second free end of said hose in a U-shaped configuration, wherein said interference means comprises a hose hanger formed of a resilient, flexible plastic sheet form material with a star-shaped opening formed at a first end, said opening sized to removably engage said hose, and a widened tab portion at a second end of said hanger with a narrow neck area therebetween, said cabinet wall having a narrow second opening above said hose opening for receiving said neck portion of said hanger while prevening passage of said tab portion without deformation of said tab, such that said first end of said hose is secured to said pump discharge outlet and said second end of said hose is directed through said first opening to be retained in a slightly exposed position by said interference means during a shipping period and, after removal of said interference means, can be grasped to withdraw additional portions of said hose from the interior of said cabinet until said stop member engages said wall whereupon said hose retainer can be attached to said second free end and said second free end directed toward a drain.

* * * * *